Patented Jan. 13, 1948

2,434,388

UNITED STATES PATENT OFFICE 2,434,388

CANNING FOODS

Joseph R. Brehm, Auburn, N. Y.

No Drawing. Application June 5, 1936,
Serial No. 83,716

6 Claims. (Cl. 99—154)

This invention or discovery relates to the manufacture and preservation of certain types of foods and combinations of foods in hermetically sealed containers at present in common parlance and hereinafter called "canning." The objects of this invention are to improve present methods of canning foods, to can types of food not heretofore lending themselves to canning, and to create new types of canned foods.

Foods may at present roughly and without a definite line of demarcation be divided into acid foods and non-acid foods. In the art of canning at present it is well understood that the more acid a food is, the less heat will be required to sterilize it. But here again there is no definite line of demarcation and a food may be preserved without any heat at all if the degree of acidity is sufficient, although perhaps the nature of the acid is also a factor. Various food products containing in the neighborhood of two percent of acetic acid based on the water content of the product are an illustration of this complete pickling and are known as various kinds of pickles, the acetic acid being obtained from vinegar.

Again, it is at present known in the art of household canning that the addition of a little lemon juice to the liquor in which a non-acid food is canned will materially aid in cutting down the temperature required for sterilizing, indeed so much so that foods which could not otherwise be sterilized in any convenient time in boiling water (212 F. degrees) can, with such addition or admixture, be canned successfully.

But the conditions for the success of this procedure are that the liquor in which the food is canned shall be relatively free flowing or that the food shall present relatively large surfaces to the additional acid, or that it shall be mashed or made into a puree or that the portion of the food which is not exposed in relatively large surface shall be sterile.

This last condition is illustrated by a whole vegetable wherein the vegetable with the exception of the surface is naturally sterile and contamination of the surface may be taken care of by added acid.

But by no manner or means could any of the above processes (except the complete pickling without heat) be applied to fruits, vegetables, or meats which have been sliced, diced, cut, heated, cooked, crushed or otherwise had their cellular structure so changed that it permits ingress or permeation by spoilage bacteria. The same applies to manufactured food where the process of manufacture is such that spoilage organisms are not confined to the surface. Neither are any of these processes applicable where any portion of the fruit, vegetable or meat, however infinitesimal, has lost its healthy sterility and has become contaminated below the exposed surface.

One object of my invention or discovery is to provide for a sufficiently complete permeation of acid throughout the tissue of sliced, diced or crushed vegetables, meat, fruit or manufactured foods so that they may be rendered sterile or "commercially sterile" at or below the temperature of boiling water (212° F.) without employing undue lengths of time.

This permeation may be applied in various ways, the most advantageous differing with the type of food.

The kind of acid may also be varied, but inasmuch as this description deals with foods, it is preferred to employ only those which are proven harmless by common usage in foods, for example, acetic acid, citric acid, tartaric acid, hydrochloric acid, maleic acid, phosphoric acid, and lactic acid, although others, especially acid fruit juices, are by no means excluded.

As an illustration of the preservation or canning of one type of relatively non-acid food, the cut, diced, sliced, shredded or otherwise comminuted potato may be used, and to avoid repetition with several acids, 100 grain vinegar will be used, as an example of an edible acid.

Potatoes are preferably washed, peeled, the eyes removed, and cut as in present art.

In my process, such cut potatoes are then allowed to stand under sufficient water to cover them completely, such water containing a small portion of 100 grain vinegar, the amount represented by the formula:

$$\frac{\text{weight of potatoes plus weight of water}}{49}$$

equals weight of 100 grain vinegar to be added, being illustrative and workable on potatoes of medium age or ripeness, although both the kind and amount of acid used may be varied within wide limits, which depend mostly upon the age of the potatoes. For "old" potatoes almost ready to sprout, the factor 49 in the immediately above formula may be reduced to 24. But "new" unripe potatoes are better treated by an alternate method hereinafter described. The denominator in the foregoing formula may be between 24 and 49, depending upon the age of the potatoes.

The potatoes are allowed to stand under this acidulated water until the acid to a substantial degree has been absorbed into the tissue of the potato or has diffused into or permeated the potato tissue, thereby increasing the hydrogen ion concentration of the cut potato tissue to a point where sterilization can be effected at relatively low temperature.

For potatoes acidulated according to the above formula, I find that eight hours' standing under the acidulated water is good minimum practice, allowing a reasonable factor of safety, to compensate for the minor factor of temperature, while the more or less 68 hours' interval from Friday noon to Monday morning may be used, if the mixture of potatoes, water and vinegar be kept cool, although the mixture of itself will eventually spoil by bacterial action.

Foods which have stood under acidulated water, as above, will hereinafter be known as "light pickled" foods.

In my process, the cut potatoes are then cooked in the vinegar water solution in which they have been standing, or they may advantageously in the case of long standing under acidulated water be transferred to a fresh vinegar water solution of substantially the same strength as above.

Such cooking may be in a pot over an open flame at boiling or in an open steam jacketed kettle, or under steam pressure at, above, or below boiling as in present practice.

Especially advantageous in the case of "new" immature potatoes, I have found that the two immediately preceding processes may be reversed and the cooking precede the "light pickling."

I have discovered that this water-vinegar liquor may be drained away from the cut, cooked potatoes, and the cut, cooked potatoes even washed or rinsed with unacidulated water, removing most of the vinegar from the liquor surrounding the potatoes without materially affecting the acid which has been diffused into the tissue of the potato.

Such "light pickled" cut potatoes may be canned as such, with or without draining and/or washing, even in neutral brines or liquors as in present practice, but I have discovered that they also lend themselves to combination with other foods as hereinafter described.

I have found that this process of definitely infusing acid solutions well into foods prior to sterilizing may be brought about in different ways than that indicated above for potatoes. In treating alimentary pastes prior to canning, macaroni may be taken as an example. The best procedure for macaroni is: Boil 7½ gals. of water and 24 fl. oz. of 100 grain vinegar together, and, when the acidulated water is boiling, add 8 pounds of macaroni and continue to boil 15 to 20 minutes. The macaroni on being boiled absorbs the acidulated water, and its subsequent treatment is as described hereinafter.

Foods treated as above for macaroni will also hereinafter be called "light pickled" foods.

In treating meats, such as chicken, salmon, veal, tuna fish, etc., my procedure is similar to that for potatoes, except that the meat apparently has more resistance to changing its acidity than do vegetables, and, due to this, somewhat higher concentrations of acid are necessary, that being represented by the formula $$\frac{\text{weight of meat plus weight of water}}{19}$$

equals the weight of 100 grain vinegar being satisfactory. Sometimes in treating oily or greasy meats, it is advantageous to boil the meat in the vinegar solution, skim off the fat and allow to stand, as in the alternate treatment of potatoes. In using previously canned meats, the meats are usually soft enough to be consumed as foods without boiling before re-canning, as is described later under onions.

Onions may be considered as an example of a vegetable product of tender tissue not requiring preliminary boiling. To prepare onions by this method of canning they are peeled, cut or ground, as in common practice, and then allowed to soak four hours or longer in light pickling vinegar, and are then ready for canning, as above.

The procedure is not limited to raw vegetable foods. Canned pimentos, for example, may be removed from their cans and be treated as for onions.

But these treatments of foods are not necessarily finished products of themselves, for, with the addition of acids to them, their original character, especially taste, may sometimes be changed slightly. One purpose behind such treatment of foods is to provide a "base" for more highly finished foods of the class that are known as "bulk salads." A "bulk salad," for the purpose of this description, may be defined as one which is to some extent homogeneous, for example, potato salad, chicken salad, etc.

In the manufacture of bulk salads, in addition to the base which may consist of a single vegetable or a mixture of foods, it is necessary to add a salad dressing, and, inasmuch as the definition of salad dressing and mayonnaise has been changed several times during the ten years preceding this description, the term salad dressing or "dressing" here means something added to the base to make a finished salad.

The most important characteristic of a salad dressing for this purpose is that it be definitely resistant to the heats used in canning. Such dressings are prior art, but for this purpose a new type of heat resistant salad dressings of superior, variable, and controllable heat resistance made without the use of pectin is to be preferred. This type of dressing is one of the objects of this invention.

In the manufacture of a salad dressing that will withstand a pasteurizing temperature of 190° F. the following new formula may be regarded as representative:

*Egg and oil emulsion*

| | |
|---|---|
| Commercial 76% egg yolk (10% sugar) | 8 lbs. 6 oz. |
| Salad oil | 3¼ gal. |
| Yellow mustard flour | 2 lbs. |
| Decorticated pepper | 3¾ oz. |
| Sugar | 3 lbs. 6 oz. |

*Starch paste*

| | |
|---|---|
| Sugar | 15 lbs. |
| Salt | 5 lbs. |
| Tapioca starch | 5 lbs. |
| White vinegar 100 gr | 6 pints |
| Water for cooking starch | 2 gal. 1 pint |
| Water for suspending starch | 1 gal. |

The method of mixing the ingredients of the egg and oil emulsion is to add the sugar, pepper and mustard to the egg yolk in a bowl, and add the salad oil gradually to them with constant stirring, best done with a mechanical beating machine as in common practise.

The method of mixing the ingredients of the starch paste is to suspend the starch in the "water for suspending starch" and add it to the remainder of the ingredients, which have been mixed together in a cooking vessel. The whole is then cooked with stirring until the starch swells, or beyond, after which point of cooking the starch is cooled to perhaps 140° F. or below, and added to the previously prepared egg and oil emulsion and mixed intimately, also as in common practise.

In this particular new formula, it will be observed that the ratio of commercial egg yolk to salad oil is one to three by weight, and such a ratio is adequate to produce a salad dressing that will withstand a pasteurizing temperature of 190° F.

But should a salad dressing be desired that will withstand a temperature of canning sterilizing up to 270° F. or greater, such can be made according to the above new formula by substituting for the 3¼ gallons of oil an equivalent weight of commercial egg yolk, bringing the total commercial egg yolk to substantially 33⅓ pounds and reducing the salad oil to naught.

In principle, it is discovered that this constitutes a new way of manufacturing heat resistant salad dressings, the greater the concentration of egg yolk, the greater the resistance to heat. But it is entirely probable that the somewhat large amount of water called for in the above formula is also a factor, and certainly the starch has a stabilizing effect. Likewise, the effect of the acid of the vinegar is necessary in securing sufficient acidity to render the salad dressing commercially sterile at temperatures at or below boiling. The remainder of the ingredients of the formula are probably important only as flavoring materials.

In preparing finished salad, the liquor used in cooking is drained off and the potatoes, macaroni, meat, etc., mixed with the salad dressing. In the case of potatoes, it may be necessary to rinse the potatoes with cold or hot water or water containing 1/60 of its weight of 100 grain vinegar.

Suitable preferred formulas for making finished salads by my process follow:

Potato salad

| | |
|---|---|
| Cooked, diced, light pickled potatoes | 35 lbs. |
| Chopped light pickled onions | 0 lbs. 5 oz. |
| Chopped light pickled sweet pimento peppers | 0 lbs. 15 oz. |
| Salad dressing as above | 11 lbs. 0 oz. |

Macaroni or meat salad

| | |
|---|---|
| Cooked light pickled macaroni or cooked light pickled diced meat | 30 lbs. |
| Chopped light pickled onions | 0 lbs. 5 oz. |
| Chopped light pickled sweet pimento peppers | 0 lbs. 13 oz. |
| Sugar | 1 lbs. 0 oz. |
| Water | 3 lbs. 0 oz. |
| Salad dressing as above | 14 lbs. 0 oz. |
| Salt | 0 lbs. 3 oz. |

The mixing of these materials may be by any convenient method of present art, by a paddle or by tumbling, but mechanical paddle mixers are best avoided, due to their too severe action.

The mixed salad is then filled into cans, sealed and heated under water maintained at 190° F. for a suitable time, ninety minutes being adequate for a can containing one pound of salad, and at 190° F. for five hours being adequate for a can containing seven pounds of salad.

If that salad dressing made by substituting egg yolk for the oil be used, I have discovered that the temperature of sterilization can be increased and the time correspondingly decreased. I have found that, when no oil is used in the formula for the salad dressing, temperatures as high as 270° F. may be used in sterilizing, although lower temperatures of 240° F. to 250° F. are preferable. Under these conditions, I have found that the light pickling of the base ingredients of the finished salad is unnecessary. The finished salad is then made by mixing ordinary (not light pickled) base materials and salad dressing containing no oil substantially in the proportion indicated above for salads made with light pickled base materials.

It is plain that interpolations, extrapolations and variations can be made of this specification, but what I claim is:

1. As an article of manufacture, a canned, commercially sterile salad comprising a light pickled base and a heat stable, emulsified dressing containing egg yolk and an edible oil.

2. As an article of manufacture, a canned, commercially sterile potato salad comprising a light pickled base of cut potatoes, other light pickled base materials, flavoring materials, and a heat stable dressing.

3. As an article of manufacture, a canned, commercially sterile salad comprising a light pickled base and a heat stable salad dressing.

4. Process of making pasteurized potato salad comprising bringing vegetable oil into emulsion with a cooked aqueous solution of starch whereby to prevent separation of the components of the emulsion upon the subsequent processing, mixing said emulsion with vinegar pickled and cooked potato pieces, and processing this final mixture in containers at a temperature of approximately 190° F., but below the boiling point of water.

5. Process of making pasteurized potato salad comprising bringing egg yolk, vegetable oil and a cooked aqueous solution of starch into an emulsion characterized in that it is stable during subsequent processing, mixing said emulsion with vinegar pickled and cooked potato pieces, and processing this final mixture in sealed containers at a temperature of approximately 190° F., but below the boiling point of water.

6. As an article of manufacture, canned, commercially sterile light pickled potatoes.

JOSEPH R. BREHM.

REFERENCES CITED

The following references are of record in the file of this patent:

UNITED STATES PATENTS

| Number | Name | Date |
|---|---|---|
| 821,947 | Melton | Jan. 26, 1932 |
| 1,098,006 | Allen | May 26, 1914 |
| 1,354,564 | Jaeger | Oct. 5, 1920 |
| 1,385,503 | Snyder | July 26, 1921 |
| 1,448,512 | Benjamin | Mar. 13, 1923 |
| 1,842,720 | Harris | Jan. 26, 1932 |
| 1,889,123 | Jones | Nov. 29, 1932 |

OTHER REFERENCES

Everybody's Cook Book, 1924, pages 641, 671, 673 and 674.

Commercial Fruit & Vegetable, by Cruess, pages 18, 89–92.